(12) United States Patent
Jaramillo

(10) Patent No.: US 11,894,797 B1
(45) Date of Patent: Feb. 6, 2024

(54) SOLAR SUPPORT STRUCTURES AND METHODS

(71) Applicant: Concept Clean Energy, LLC, Laguna Beach, CA (US)

(72) Inventor: Elliot Jaramillo, La Verne, CA (US)

(73) Assignee: POWERSHINGLE, LLC, Laguna Beach, CA (US)

( * ) Notice: Subject to any disclaimer, the term of this patent is extended or adjusted under 35 U.S.C. 154(b) by 2 days.

(21) Appl. No.: 16/517,570

(22) Filed: Jul. 20, 2019

Related U.S. Application Data

(60) Provisional application No. 62/858,225, filed on Jun. 6, 2019.

(51) Int. Cl.
*H02S 20/23* (2014.01)
*H02S 20/10* (2014.01)

(52) U.S. Cl.
CPC .............. *H02S 20/23* (2014.12); *H02S 20/10* (2014.12)

(58) Field of Classification Search
CPC .......... H02S 20/00; H02S 20/10; H02S 20/20; H02S 20/21; H02S 20/22; H02S 20/23; H02S 20/24; H02S 20/25; H02S 20/26; H02S 20/30; H02S 20/32; F24S 20/66; F24S 20/67; F24S 20/69; F24S 2020/12; F24S 2020/13
See application file for complete search history.

(56) References Cited

U.S. PATENT DOCUMENTS

| | | | | |
|---|---|---|---|---|
| 5,180,442 A | * | 1/1993 | Elias | H02S 40/34 136/251 |
| 5,740,996 A | * | 4/1998 | Genschorek | F24S 40/44 248/237 |
| 2008/0315061 A1 | * | 12/2008 | Fath | F24S 25/20 248/510 |
| 2012/0174968 A1 | * | 7/2012 | Karg | H02S 20/23 136/251 |
| 2014/0263902 A1 | * | 9/2014 | Conley | F24S 25/634 248/222.11 |
| 2019/0386601 A1 | * | 12/2019 | Keller | F24S 25/617 |
| 2020/0162014 A1 | * | 5/2020 | Gisep | F24S 20/67 |

FOREIGN PATENT DOCUMENTS

| | | | | |
|---|---|---|---|---|
| EP | 1734588 A2 | * | 12/2006 | ............... F24J 2/045 |
| FR | 2997171 A1 | * | 4/2014 | ............... F16J 15/027 |
| JP | 2001027024 A | * | 1/2001 | ............... F24S 25/20 |
| WO | WO-2012119162 A1 | * | 9/2012 | ............... F24J 2/5205 |

OTHER PUBLICATIONS

Lumos, SolarScapes specification sheet, 80 Big Springs Drive | Nederland, Colorado 80466.
Lumos, GSX Module System, specification sheet, 80 Big Springs Drive | Nederland, Colorado 80466.
Lumos, LSX Module System, specification sheet, 80 Big Springs Drive | Nederland, Colorado 80466.

* cited by examiner

*Primary Examiner* — Ryan S Cannon
(74) *Attorney, Agent, or Firm* — FisherBroyles, LLP; W. Scott Harders

(57) ABSTRACT

A system and method of providing a solar support structures for columns of shingled photovoltaic solar panel assemblies.

17 Claims, 7 Drawing Sheets

SOLAR SUPPORT STRUCTURES AND METHODS

This application claims the benefit of U.S. Provisional patent application No. 62/858,225 filed on Jun. 6, 2019.

Photovoltaic (PV) panels are widely used to convert solar energy to electrical power. A typical solar panel installation is comprised of a grid system employing one of many various types of structural products typically mounted on either rooftops or ground mounted applications using a variety of racking products. Additionally, over the course of the past several years, there has been a significant increase in the use solar panels mounted to elevated rack "shade" structures for the dual purpose of providing shade and protection from elements to the underlying area as well as energy production.

Regardless of solar structure—roof, ground or shade—current methods for mounting solar panels arrange the PV panels with a small gap between each panel to allow for expansion and contraction between adjacent panels. Whatever the gap dimensions specified by each panel manufacturer, any such gap is problematic whenever a watertight or near watertight solution is desired, because each gap allows water to penetrate and leak through the PV panel array. Sealing such gaps between panels in an array of multiple panels, is burdensome and difficult since adjacent panels are disposed in a common plane and typically with adjacent edges arranged together in a butt condition, as opposed to an overlapping or shingled arrangement. In such a plane environment, it may be relatively straightforward to seal two of the four edges of a (typically rectangular) PV panel system using various rails that seal gaps on two edges of each panel. However, sealing all four edges of each PV panel in an array of multiple panels is much more difficult. Exemplary methods for sealing at least two of the gaps include use of a gasket or sealant between the panels, which sealing methods degrade over time and can result in unforeseen consequences such as dirt buildup along the panel edges. Another method to seal the array is to install a sub-roof underneath the entire array of panels. However, this can result in other negative consequences, such as increased cost and construction time as well as excessive heat buildup underneath the panels and the inability to utilize a backside of the panels when bi-facial solar panels which gather light energy from both top and bottom surfaces of the panel are used.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

There are several related aspects of this disclosure. Generally, one aspect concerns modular, reconfigurable, shingled photovoltaic systems, assemblies and methods. Yet other aspects concern an easy to implement solar shingling structure providing shade or otherwise providing cover from elements including sun, rain and wind including integral paths to divert water, dust and debris while minimizing areas to collect the same.

Disclosed systems and methods are simple, yet effective to provide shelter from elements and allow the array of PV panels to shed water with minimum or no leakage or buildup of water or dirt around any of the exposed panel edges.

Disclosed systems and methods are different than other shingle or roof systems, since the panels do not overlap or touch on all sides, but instead rely on our two-part rail system to create a channel for water runoff on the two sides between adjacent panels in the plane condition, while allowing water runoff on the other two sides of the panel due to the shingle arrangement. The channel is sufficiently deep to allow for the angle necessary to create the shingling arrangement as well as to provide sufficient material for the attachment of the shingling rail to the channel rail. A gasket and/or sealant between the panels where they overlap in the shingled arrangement prevents the edges of the shingled panels from coming into contact with each other and rattling during wind events and as well as further sealing the shingled edges of the panels to create a watertight or near watertight solution.

The disclosure can be understood more readily by reference to the following detailed description, examples, and claims, and their previous and following description. Before the present system, devices, and/or methods are disclosed and described, it is to be understood that the invention is not limited to the specific systems, devices, and/or methods disclosed, as such can, of course, vary. It is also to be understood that the terminology used herein is for the purpose of describing particular aspects only and is not intended to be limiting.

The following description is provided as an enabling teaching of the invention in its best, currently known aspect. Those skilled in the relevant art will recognize that many changes can be made to the aspects described, while still obtaining the beneficial results shown and described. It will also be apparent that some of the desired benefits can be obtained by selecting some of the features without utilizing other features. Accordingly, those who work in the art will recognize that many modifications and adaptations are possible and can even be desirable in certain circumstances and are a part of the present disclosure. Thus, the following description is provided as illustrative of certain principles and not in limitation thereof.

Figure 1:
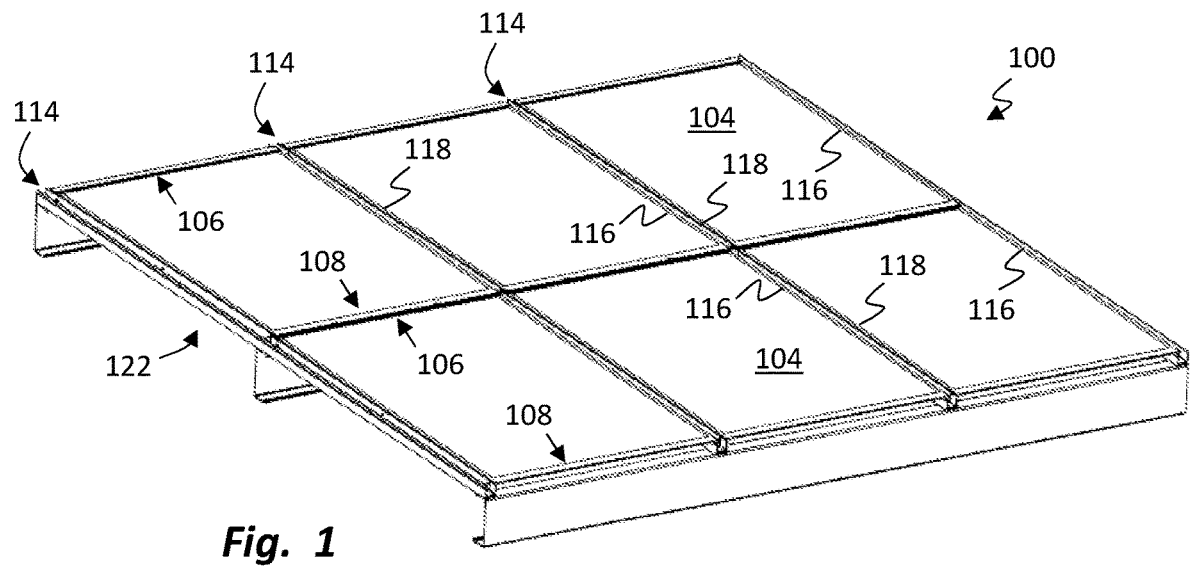
FIG. 1 is a perspective view of a solar support structure with photovoltaic panels and supports according to an aspect of the disclosure.

With reference to FIG. 1, a solar support structure 100 allows PV panels 104 to be mounted in a slightly overlapping or shingled arrangement on two opposed edges 106, 108, where edge 108 of one panel overlaps edge 106 of a neighboring panel. Exemplary structures 100 include columns of shingled panels separated by at least one channel 114 for water runoff between the panels 104 on the other two edges 116, 118 while keeping the backside 122 of the panels relatively unobstructed to accept any potential reflected light energy, which is desirable when bi-facial solar panels are used. The systems and methods employing such a solution solve multiple problems. For example, PV panels 104 are not required to be mounted in a plane and do no not result in butting conditions between any of the four edges 106, 108, 116, 118 of the PV panels and the undesirable features of such an arrangement.

Figure 2:
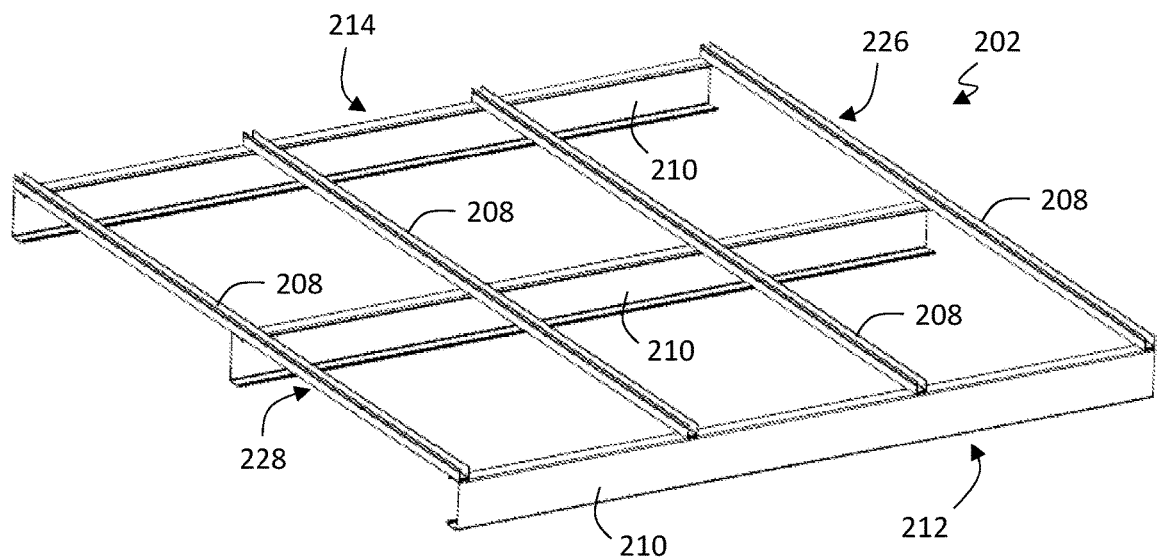
FIG. 2 is the solar support structure of FIG. 1 without photovoltaic panels.
Figure 9:
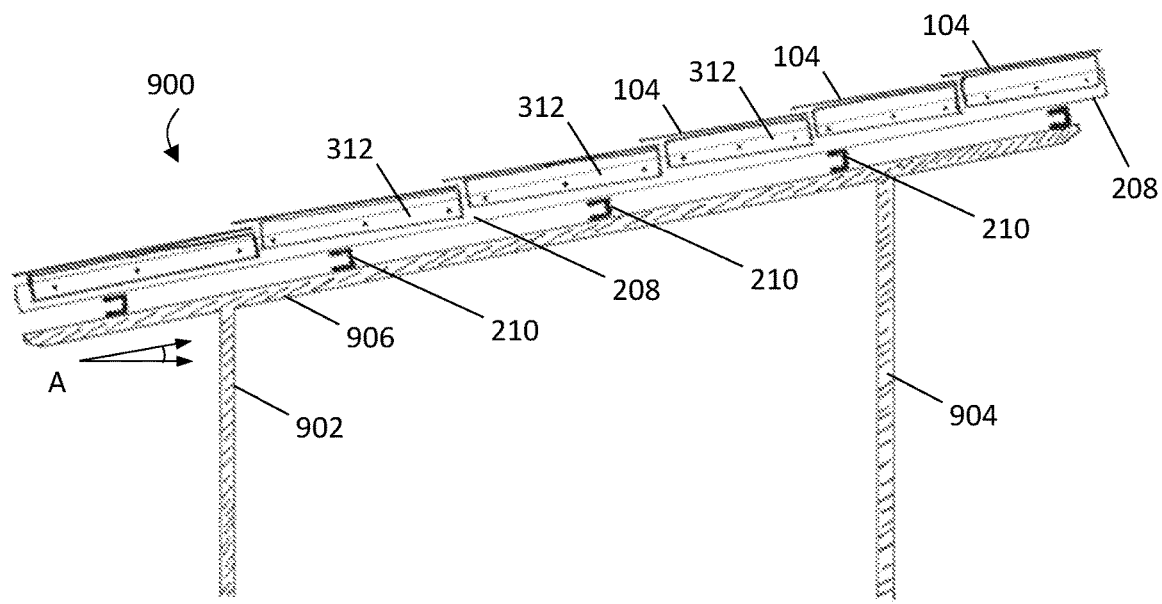
FIG. 9 is a side view of a mounted solar support structure.

As depicted by reference to FIG. 2, a structure 100 may include a two part rail framework 202 having a plurality of preferably extruded channel rails 208 connected to purlins 210 all supported above ground by an underlying support structure (FIG. 9). The structure 100 may be mounted to have first and second opposed edges, 212, 214 respectively, where one edge, for example edge 214 is disposed in an elevated position relative to the other edge, 212. Connecting the edges are sides 226, 228. As further discussed below, in one embodiment, the channel rails 208 each include a central channel that acts to direct water and debris from the structure 100. When in place, the channel rails 208 are arranged and mounted in a common plane on the framework 202.

Figure 3:
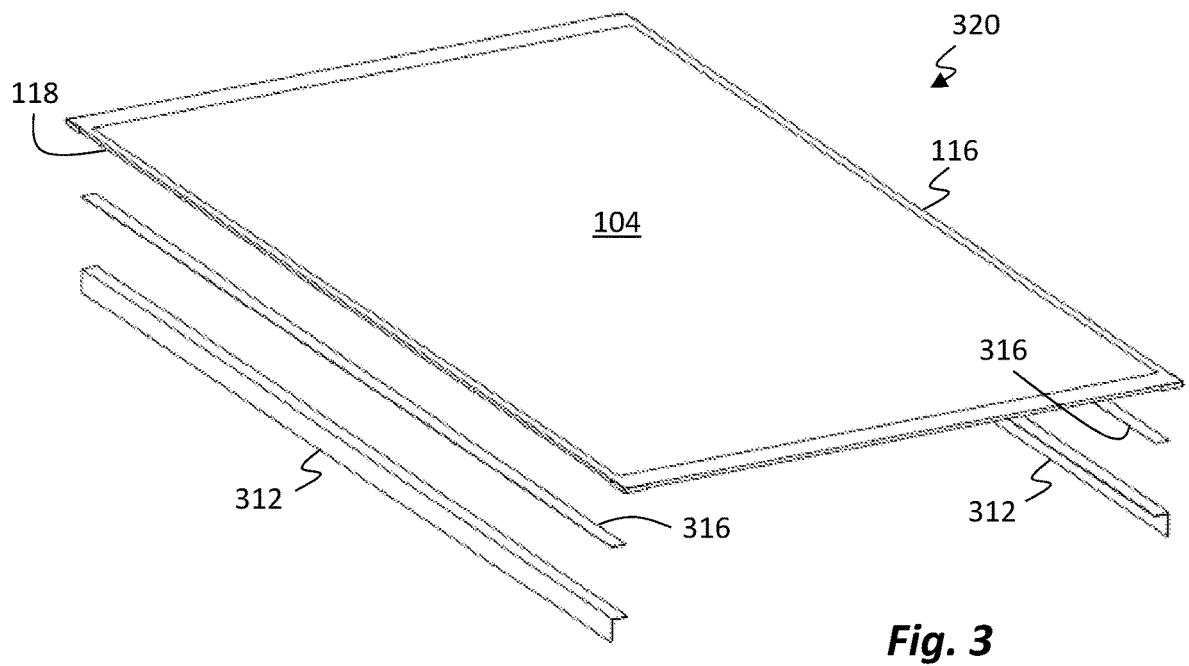
FIG. 3 is an exploded view of a photovoltaic panel assembly.
Figure 4:
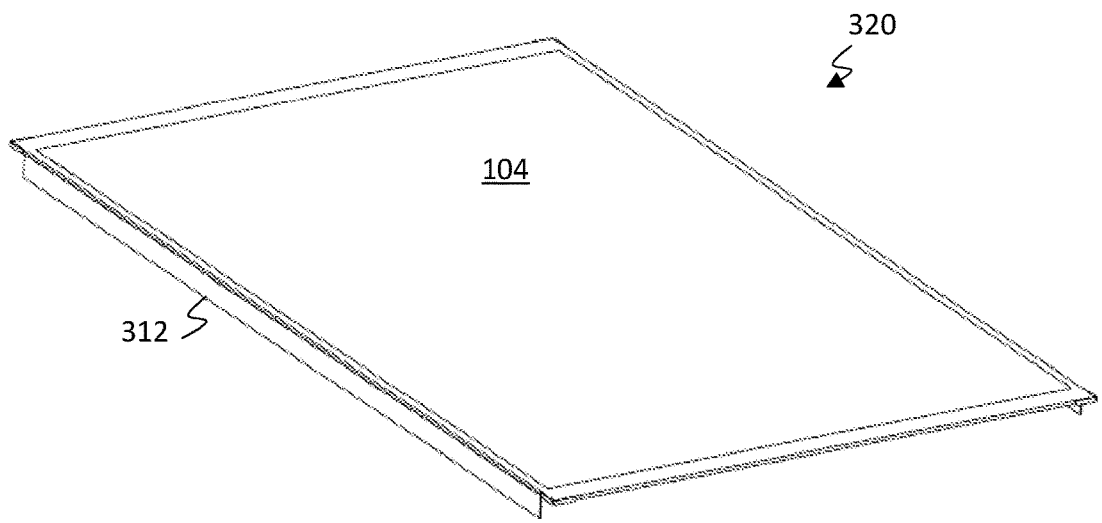
FIG. 4 is a perspective view of a photovoltaic panel assembly.

With reference now to FIGS. 3 and 4, in one embodiment, each panel 104 has shingle rails 312 that are adhered or otherwise connected to respective undersides of each PV panel 104 along the other sides 116, 118. In one embodiment, the adhesive is formed in strips 316 as depicted formed of 3M™ VHB™ tape and other suitable very high bond, structural adhesive tapes. In other embodiments, where the PV panel includes a frame around its periphery, shingle rails can include flat bar stock, such as aluminum strips, that can be adhered or mechanically affixed to the frame. In yet another embodiment, shingle rails may form formed integrally with the PV panels during manufacture by the panel supplier.

Collectively, the panels with shingle rails 312 form panel assemblies 320 to be mounted onto a framework 202 (FIG. 2). In other embodiments, modified shingle rails can include flat bar stock, such as aluminum strips, that can be adhered or mechanically affixed to a side of a photovoltaic panel having a frame or otherwise formed to accept connectors.

Figure 5:
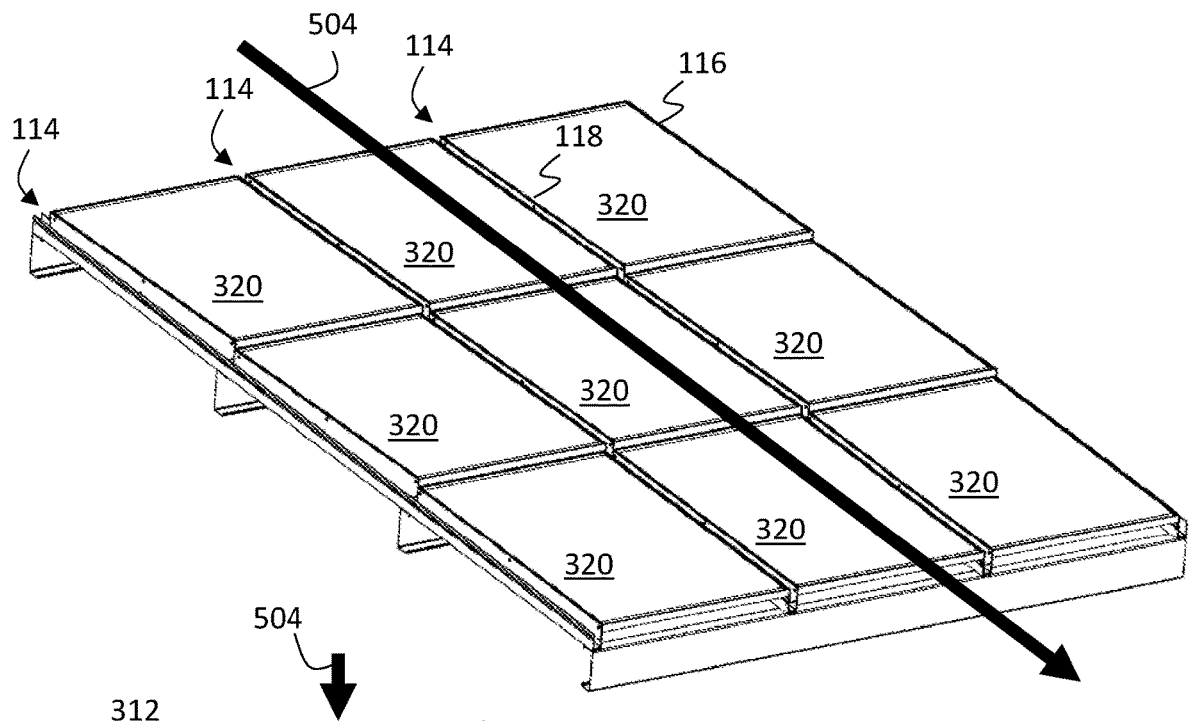
FIG. 5 is a perspective view of a solar support structure.

Referring now to FIG. 5, the panel 104 and shingle rail 312 assemblies 320 are then connected with the channel rails 208 in a fashion where a "column" indicated by arrow 504 of panel assemblies 320 are arranged so that adjacent panels 104 in a column 504 slightly overlap or shingle along two of the panel edges 106, 108. The other two panel edges 116, 118 lie adjacent to or overlie either an exterior edge 228 of the rail framework 202 or a channel 114 defined in the channel rail 208.

Figure 6:
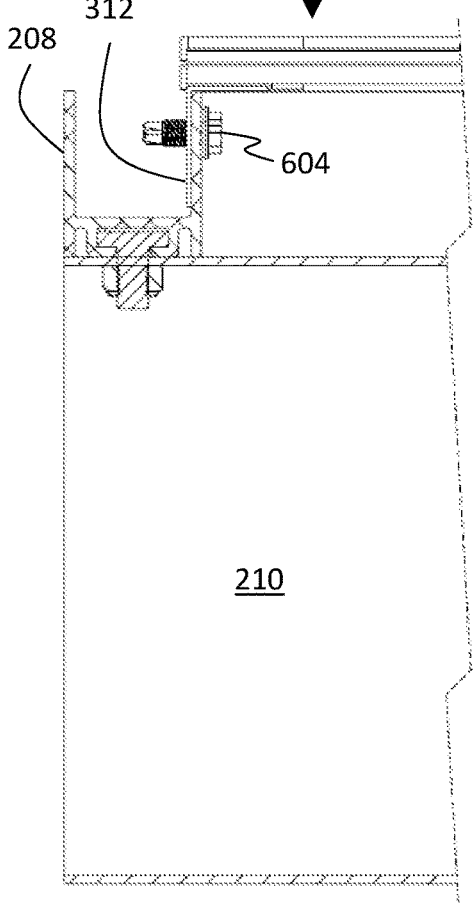
FIG. 6 is a partial cross-sectional view of an edge of a solar support structure.

With reference to FIG. 6, the shingle rails 312 are connected from beneath the rail framework 202 (FIG. 2) so that panels in a column 504 slightly overlap or shingle relative to other panels in the column 504. The shingle rail 312 connects to the channel rail 208 at appropriate locations while allowing for the angle needed to maintain a shingled arrangement to be achieved. Although screws 604 are shown, the connection mechanism is not so limited and can be made by known means.

Figure 7:
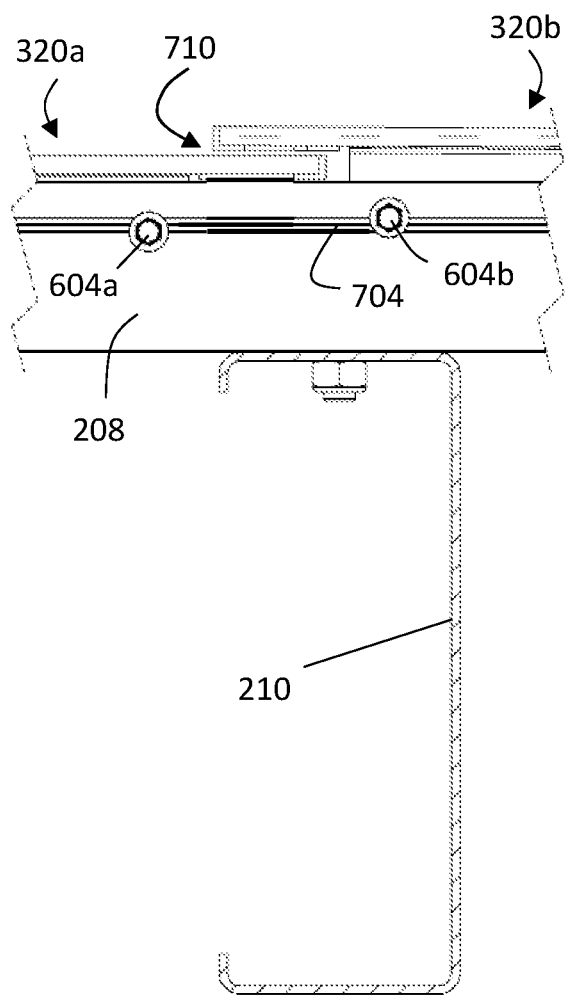
FIG. 7 is a partial side view of a pair of panel assemblies in an overlap or shingle arrangement.

Referring now to FIG. 7, a two panel assemblies 320*a* and 320*b* are shown in an enlarged, overlap or shingle orientation. As can be seen, the upper panel assembly 320*b* overlaps but preferably does not touch the lower panel assembly 320*a*. The shingle rail 312*b* extends into the channel rail 208 and the two are held in place by connector 604*b*. Guide marks 704 on the connector side of the channel rail 208 indicate approximate upper and lower connection points for connectors 604*a*, 604*b*. A gap 710 can be filled with silicone or other sealants (not shown) or by a gasket or the like. We have found that a combination of a clip and rubber gasket at the overlap aids in structural integrity, inhibits wind uplift of panel assemblies, and retards wind, dirt, dust and the like from seeping. It can now be appreciated that a roof or overhead structure may be assembled with the panel assemblies providing both the watertight cover as well as electrical power without the need of a sub-structure. Additionally, the omission of a sub-structure permits assembly of the structure by affixing the panel assemblies directly in the structure from below, preventing need to work atop the structure and on the photovoltaic panel faces. In other embodiments, shingle rails 312 span the edges of associated panels and abut or nearly abut the shingle rail 312 of the overlapped or overlapping panel. Where possible depending, for example, on panel design, the abutting shingle rails would eliminate or considerably reduce the gap illustrated while retaining the ability to assemble from beneath and provide a water tight or near watertight "roof."

Figure 8:
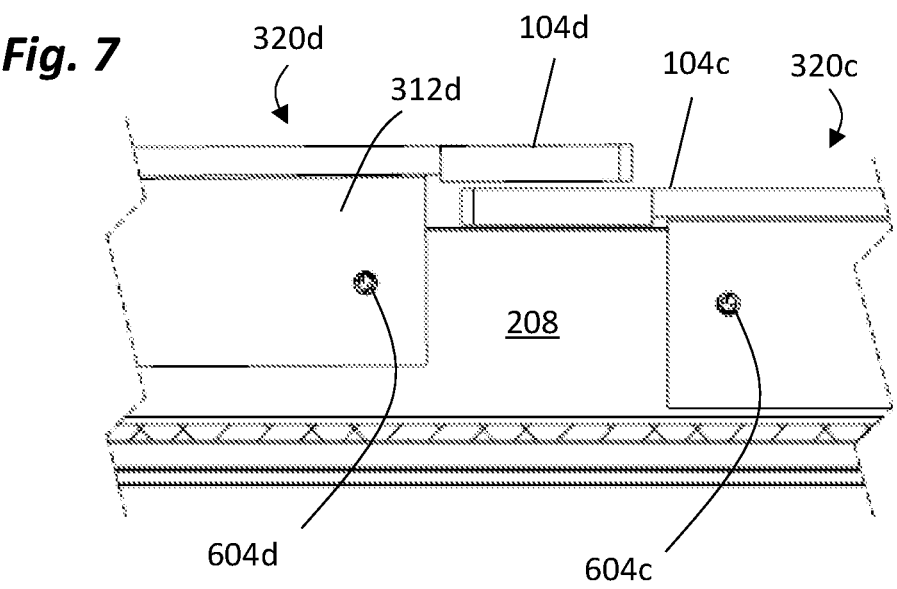
FIG. 8 is a partial side view of a pair of panel assemblies in an overlap or shingle arrangement.

Referring now to FIG. 8, overlapping panel assemblies 320*c* and 320*d* are shown to indicate the shingle rail 312*d* of the upper assembly 320*d* extends above the channel rail 208 about the thickness of a PV panel 104.

With reference now to FIG. 9, in one embodiment, a mounted solar support structure 900 includes a first support post 902 and a second support post 904 secured into or onto the ground (not shown). Spanning the first post 902 and second post 904 is a support rail 906 having a length about the same of the expected solar support structure to be mounted thereon. In the depicted arrangement, one of the support posts is taller than the other to dispose the support rail 906 at an angle A relative to the ground.

Figure 10:
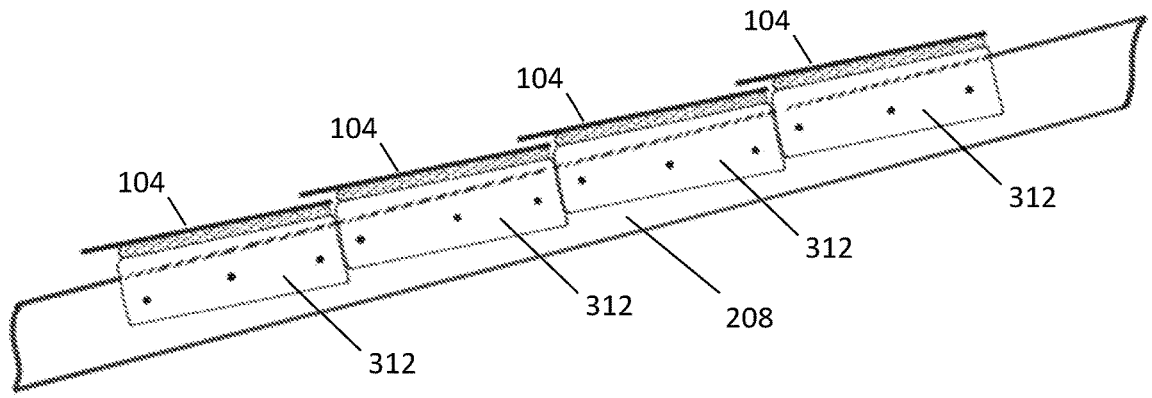
FIG. 10 is an enlarged side view of solar panel assemblies in a shingled arrangement.

With reference to FIG. 10, an enlarged detail shows the shingling rails 312 being connected to the channel rail 208 at an angle so that at least upper photovoltaic panels 104 lie out of the plane formed by tops of the channel rails. Additionally, the panels 104 lie at an angle different than angle A.

Figure 11:
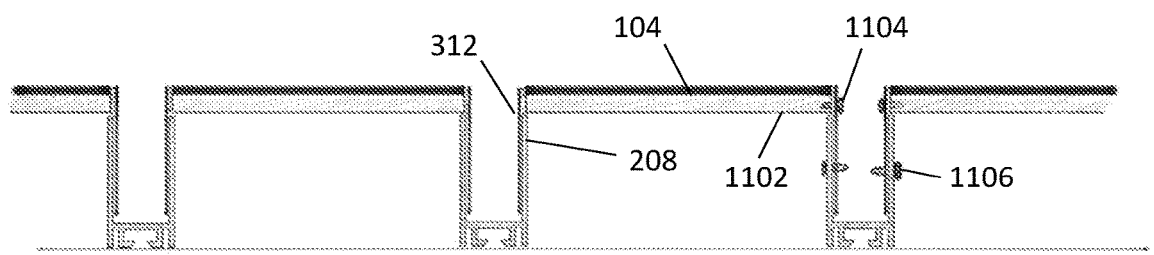
FIG. 11 an illustration of solar panel assemblies according to one embodiment.

Referring to FIG. 11, in one embodiment the photovoltaic panels 104 are surrounded by a frame 1102, typically an aluminum frame connected to and surrounding the periphery of the panel. In this embodiment, the shingling rail 312 connects to the frame 1102 illustrated by screws 1104. The shingling rail 312 is in turn connected to the channel rail 208 illustrated by screws 1106.

Figure 12:
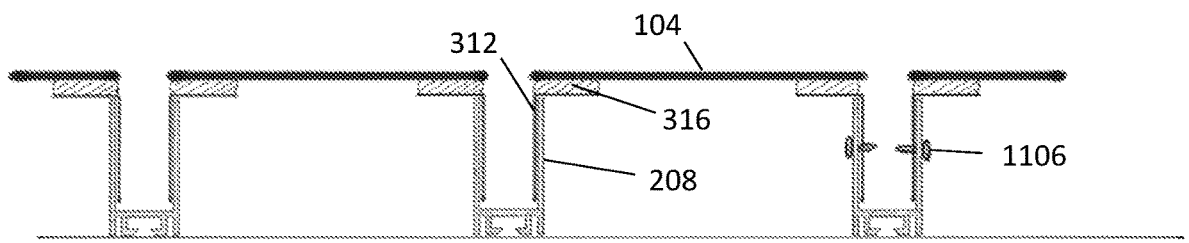
FIG. 12 an illustration of solar panel assemblies according to another embodiment.

In contrast, and with reference to FIG. 12, in an embodiment the photovoltaic panels 104 are so-called frameless panels. Here, each panel 104 has shingle rails 312 that are adhered or otherwise connected to opposed undersides of each panel 104 by an adhesive strip 316. The shingling rail 312 is in turn connected to the channel rail 208 again illustrated by screws 1106.

Figure 13:
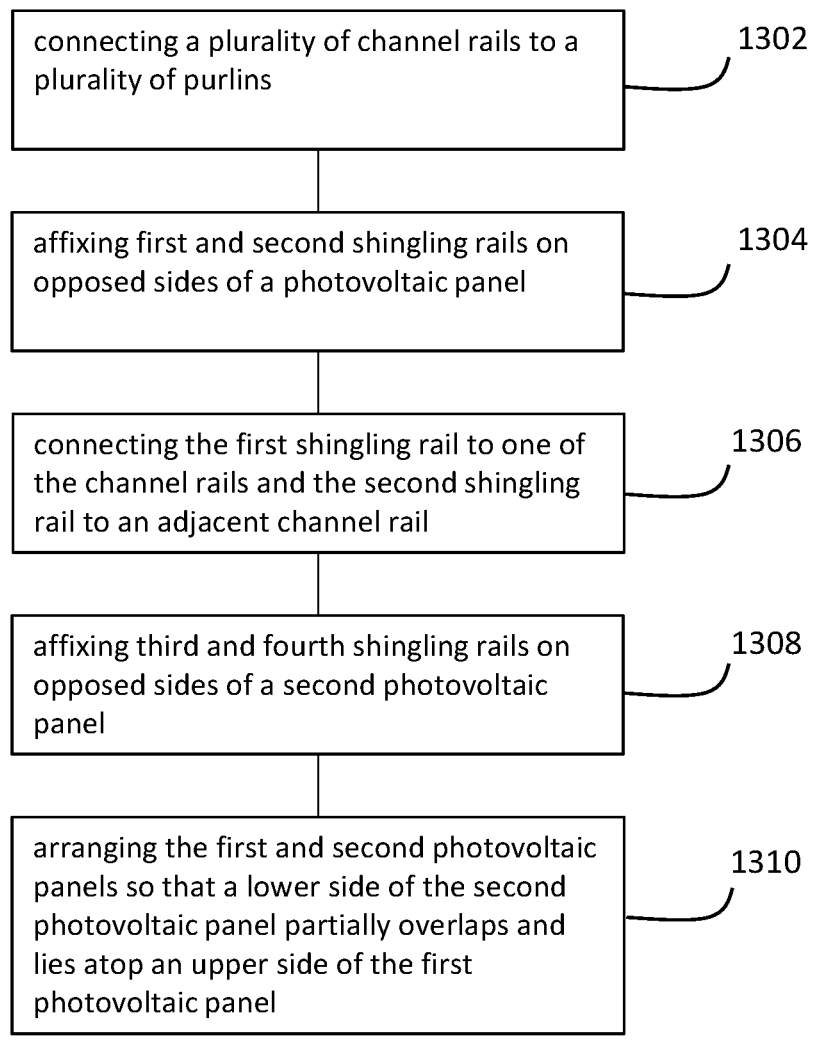
FIG. 13 depicts exemplary solar structure method steps.

Referring now to FIG. 13, a method of assembling a solar support structure is provided. Unless noted or obviously required by sequence, the method steps are not necessarily required to be accomplished in any particular order. In one embodiment, the method includes connecting a plurality of channel rails to a plurality of purlins forming a rail framework elevated such that the channel rails lie in a common plane angled relative to level 1302.

The method also includes, again, without reference to order suggested by the numbering or discussion, affixing a first shingling rail to a first side of a first photovoltaic panel and a second shingling rail to a second side of the first photovoltaic panel 1304. The method then calls for connecting the first shingling rail to one of the channel rails and connecting the second shingling rail to an adjacent one of the channel rails channel rails 1306. The method calls for affixing a third shingling rail to a side of a second photovoltaic panel and affixing a fourth shingling rail to another side of the second photovoltaic panel 1308. Continuing, the method calls for arranging the first and second photovoltaic panels so that a lower or third side of the second photovoltaic panel partially overlaps and lies atop an upper or fourth side of the first photovoltaic panel 1310. When so arranged, the second photovoltaic panel lies in a plane different than the common plane. In other words, the second photovoltaic panel is angled relative to the channel rails. The method may be repeated for several panel assemblies to form a column or a plurality of columns of partially overlapping panel assemblies.

In another embodiment, the method step of connecting 1302 includes securing the shingling rail to the channel rail from an underside of the support structure.

In another embodiment, the method further includes disposing a gasket between the first and second photovoltaic panels where the third side of the second photovoltaic panel overlaps the fourth side of the first photovoltaic panel.

In another embodiment, the method further includes connecting a clip between the first and second photovoltaic panels at a location where the second photovoltaic panel overlaps the first photovoltaic panel.

As used herein, the singular forms "a," "an" and "the" include plural referents unless the context clearly dictates otherwise. Thus, for example, reference to an "orifice" includes aspects having two or more orifices unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both." When the applicants intend to indicate "only A or B but not both" then the term "only A or B but not both" will be employed. Similarly, when the applicants intend to indicate "one and only one" of A, B or C, the applicants will employ the phrase "one and only one." Thus, use of the term "or" herein is the inclusive, and not the exclusive use. To the extent that the phrase "one or more of A, B and C" is employed herein, (e.g., storage for one or more of A, B and C) it is intended to convey the set of possibilities A, B, C, AB, AC, BC, and/or ABC (e.g., the storage may store only A, only B, only C, A&B, A&C, B&C, and/or A&B&C). It is not intended to require one of A, one of B, and one of C. When the applicants intend to indicate "at least one of A, at least one of B, and at least one of C," then the phrasing "at least one of A, at least one of B, and at least one of C" will be employed.

Current methods for mounting solar panels on shade structures typically mount the panels in a plane, where panels are arranged in an abutting relation on the sides (rows in the array) and on the upper and lower sides (columns in the array). This results in gaps between the panels through which water can penetrate. Preventing leakage in the plane of panels has proven to be difficult and in instances leakage is prevented by mounting the panels on a roof or a sub roof is placed underneath the panels. The current disclosure allows the panels to be mounted in a "shingle" disposition along an edge, while creating a channel for water runoff between the panels on another edge. Such systems and methods provide benefits including panels not being required to be mounted in a plane and not resulting in butt, or edge to edge orientation between the several panels.

In one embodiment, a solar shingling system is comprised of at least two parts. A first part includes a first rail that spans underlying purlins or support structures for an array of photovoltaic panels. A second part includes a secondary rail that is adhered to the underside of the panels and connected to the first part with screws or pins at appropriate locations. The two rail pieces interact to allow the first rail to be mounted in a generally planar, but angled relative to ground, fashion, while the secondary rail allows the panels to be mounted in a non-planar arrangement and preferably in a slightly overlapping or shingled arrangement. The system is simple and efficient to implement and maintain. For example, panel mounting can be accomplished entirely from beneath the structure eliminating the need for top-side construction. Additionally, single panels can be removed and replaced from underneath the array if found defective or damaged. As described, completed systems are effective in allowing PV panels to both shed water from the structure with little or no leakage and generate electricity.

The system is different than a typical shingle roof, since the panels do not overlap side to side, but instead rely on the rail system to create a channel between the panels for water runoff. The channel is sufficiently deep to allow for the shingling effect as well as to allow sufficient material for the attachment of the shingling rail to the structural rail.

Where the panels do overlap, a gasket prevents that edge of panels from rattling during high wind and further seals the shingled edges of the panels. Optionally, clips can connect a lower edge of a "top" shingled panel with an upper edge of a "lower" shingled panel to maintain connection but separation between the panels.

Although several aspects have been disclosed in the foregoing specification, it is understood by those skilled in the art that many modifications and other aspects will come to mind to artisans having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and are not intended as limiting. For example, the disclosed structures can be "stand-alone" shade structures such as car-ports, work areas, or merely to provide cover from the elements including sun and rain while at the same time providing electrical power. In other embodiments, the disclosed structures can be implemented on existing top surfaces or roofs.

What is claimed is:

1. A method of assembling a solar support structure comprising:
   connecting a plurality of channel rails having an open, central channel defined by opposed side walls joined by a bottom to a plurality of purlins forming a rail framework such that the plurality of channel rails lie in a common plane angled relative to level;
   affixing a first shingling rail having an inverted "L" shaped profile to a first side of a first photovoltaic panel;
   affixing a second shingling rail having an inverted "L" shaped profile to a second side of the first photovoltaic panel opposite the first side of the first photovoltaic panel;
   connecting the first shingling rail to one of the walls of one of the channel rails;
   connecting the second shingling rail to one of the walls of an adjacent one of the channel rails;
   affixing a third shingling rail having an inverted "L" shaped profile to a first side of a second photovoltaic panel;
   affixing a fourth shingling rail having an inverted "L" shaped profile to a second side of the second photovoltaic panel opposite the first side of the second photovoltaic panel; and
   arranging the first and second photovoltaic panels so that a third side of the second photovoltaic panel partially overlaps and lies atop a fourth side of the first photovoltaic panel, wherein one of the photovoltaic panels lies in a plane angled from the common plane and one of the photovoltaic panels lies parallel to the common plane.

2. The method as set forth in claim 1, where the connecting the plurality of channel rails includes connecting the plurality of channel rails parallel to each other.

3. The method as set forth in claim 1, further comprising disposing a gasket between the first and second photovoltaic panels where the third side of the second photovoltaic panel overlaps the fourth side of the first photovoltaic panel.

4. The method as set forth in claim 1, further comprising connecting a clip between the first and second photovoltaic panels where the third side of the second photovoltaic panel overlaps the fourth side of the first photovoltaic panel.

5. The method of assembling a solar support structure as set forth in claim 1, where the connecting the first shingling rail step comprises:
   from underneath the solar support structure, driving a connector through one and only one wall of the channel rail into the first shingling rail.

6. The method of assembling a solar support structure as set forth in claim 1, where the connecting the first shingling rail step comprises:
   from underneath the solar support structure, screwing at least three spaced screws through one and only one wall of the channel rail into the first shingling rail, one screw at substantially each end and one in substantially the middle of the first shingling rail.

7. The method as set forth in claim 1, wherein the plurality of channel rails are extruded channel rails.

8. The method as set forth in claim 1, wherein a plane is formed by the tops of the plurality of channel rails.

9. The method as set forth in claim 1, wherein the plurality of channel rails have straight edges along the length of the channel rails.

10. A method of assembling a solar support structure comprising:
    connecting a plurality of channel rails to a plurality of purlins forming a rail framework such that an upper side of each of the plurality of channel rails lie in a common plane; affixing a first shingling rail having an inverted "L" shaped profile to a first side of a first photovoltaic panel;
    affixing a second shingling rail having an inverted "L" shaped profile to a second side of the first photovoltaic panel opposite the first side of the first photovoltaic panel; connecting the first shingling rail to one of the channel rails;
    connecting the second shingling rail to an adjacent one of the channel rails;
    affixing a third shingling rail having an inverted "L" shaped profile to a first side of a second photovoltaic panel;
    affixing a fourth shingling rail having an inverted "L" shaped profile to a second side of the second photovoltaic panel opposite the first side of the second photovoltaic panel; arranging the first and second photovoltaic panels so that a third side of the second photovoltaic panel partially overlaps and lies atop a fourth side of the first photovoltaic panel, wherein the second photovoltaic panel lies in a plane angled from the common plane, and the first photovoltaic panel lies in parallel to the common plane; and
    connecting a clip between the first and second photovoltaic panels where the third side of the second photovoltaic panel partially overlaps the fourth side of the first photovoltaic panel.

11. The method of assembling a solar support structure as set forth in claim 10, where the connecting the first shingling rail step comprises:
    from underneath the solar support structure, driving a connector through one and only one wall of the channel rail into the first shingling rail.

12. The method of assembling a solar support structure as set forth in claim 10, where the connecting the first shingling rail step comprises:
- from underneath the solar support structure, screwing at least three spaced screws through one and only one wall of the channel rail into the first shingling rail, one screw at substantially each end and one in substantially the middle of the first shingling rail.

13. The method as set forth in claim 10, wherein the plurality of channel rails are extruded channel rails.

14. A method of assembling a structure to support an array of photovoltaic panels arranged in columns and rows, the method comprising:
- connecting a plurality of parallel channel rails to a plurality of purlins forming a framework where two adjacent parallel channel rails form a column and where centers of adjacent parallel channel rails are spaced slightly wider than a width of a photovoltaic panel to be installed on the structure;
- affixing shingling rails having an inverted "L" shaped profile along a bottom side of substantially an entire length of opposed first and second sides of a first photovoltaic panel resulting in a first shingling rail affixed to the first side and a second shingling rail affixed to the opposed second side of the first photovoltaic panel;
- leaving a third and a fourth side of the first photovoltaic panel without shingling rails;
- placing the first photovoltaic panel in a first column of the structure defined by adjacent channel rails, where a part of the first shingling rail extending from the bottom side lies within a channel of one of the adjacent channel rails, and a part of the second shingling rail extending from the bottom side lies within a channel of another one of the adjacent channel rails, wherein the first photovoltaic panel lies parallel to a common plane defined by the plurality of channel rails;
- affixing other shingling rails having an inverted "L" shaped profile along a bottom side of opposed first and second sides of a second photovoltaic panel; and
- placing the second photovoltaic panel in a second column of the structure adjacent to the first column and defined on one side by a common channel rail with the first column, where a part of one of the other shingling rails extending from the bottom side of the second photovoltaic panel lies within the common channel rail;
- wherein the first photovoltaic panel and the second photovoltaic panel are separated on adjacent sides by a space permitting water and debris to flow into the common channel rail.

15. The method of assembling a structure as set forth in claim 14, further comprising:
- from underneath the structure, driving a connector through one and only one wall of the channel rail into the first shingling rail.

16. The method of assembling a structure as set forth in claim 14, further comprising:
- from underneath the structure, screwing at least three spaced screws through one and only one wall of the channel rail into the first shingling rail, one screw at substantially each end and one in substantially the middle of the first shingling rail.

17. The method as set forth in claim 14, wherein the plurality of channel rails are extruded channel rails.

* * * * *